S. H. McGIBENY.
Stock Car.
No. 232,611. Patented Sept. 28, 1880.
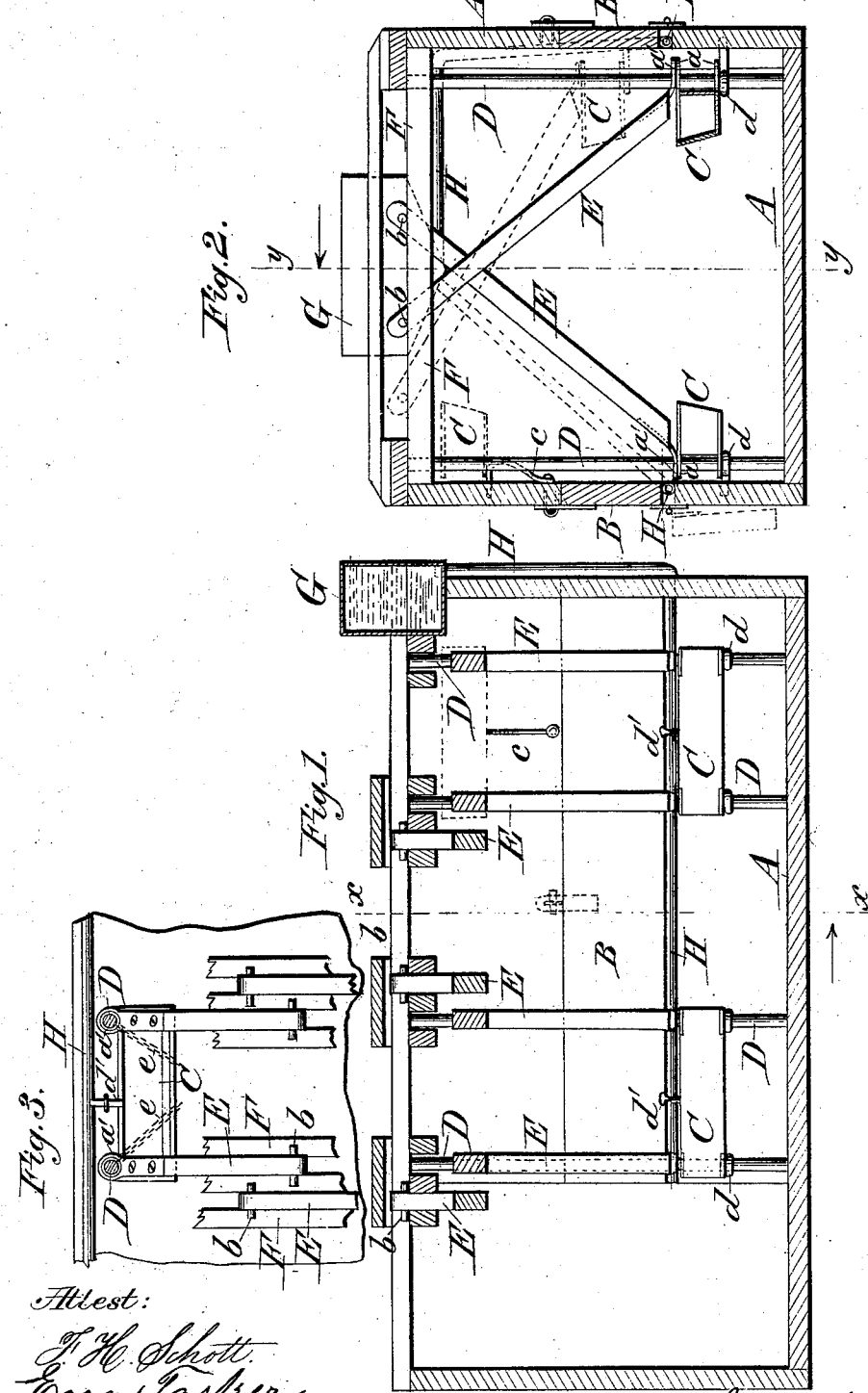

UNITED STATES PATENT OFFICE.

SYLVESTER H. McGIBENY, OF WEST ALMOND, ASSIGNOR TO HIMSELF, RICHARD H. CHARLES, OF ANGELICA, AND FREDERICK M. SHELDON, OF HORNELLSVILLE, NEW YORK, ONE-THIRD TO EACH.

STOCK-CAR.

SPECIFICATION forming part of Letters Patent No. 232,611, dated September 28, 1880.

Application filed February 16, 1880.

*To all whom it may concern:*

Be it known that I, SYLVESTER H. McGIBENY, a citizen of the United States, residing at West Almond, in the county of Allegany and State of New York, have invented certain new and useful Improvements in Stock-Cars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in that class of cars designed for carrying stock long distances, the object being to afford greater comfort to the stock, thereby delivering them in better condition, and at the same time obviate the delay caused by the necessity of unloading the cattle for food, water, and rest, as is now the common practice; and the invention consists in the construction and arrangement of the devices for supplying food and water, and in the means used for securing the cattle so as to prevent them from injuring each other or being injured by the jolts and shocks of the car, as will be hereinafter fully described, and then specifically stated in the claims.

In the drawings, Figure 1 is a vertical longitudinal section through the middle of the car. Fig. 2 is a transverse section on the line *x x*, Fig. 1. Fig. 3 is a detailed plan of one of the stalls, showing the devices used for retaining the head of the animal in place.

A represents the body of the car, constructed substantially in the same manner as those in common use, but provided with doors B upon the sides, hinged at the bottom, so as to fall down when opened for the introduction of hay or grain to the feed-boxes C. These boxes are provided, at top and bottom, on the side next the wall of the car, with guides *a a*, which are arranged to slide up and down on the vertical bars D.

Resting upon the guides *a* of the boxes are the strap-guides *a'*, attached to one end of the stall or division bars E, the other end of which passes between a pair of the guide-beams, F F, which pass from side to side of the car beneath the roof, each pair of beams being placed at such a distance apart as will allow the stall-bar to slide freely between them, its upper end, which projects above the beams, being provided with a cross-pin, *b*, which prevents it from falling out.

As it is generally desired to place the animals in such a manner that their heads and tails shall alternate, thus giving them more room, and preventing them from fighting by keeping their heads at a distance equal to the width of two stalls from each other, it becomes necessary to have two stall-bars in close juxtaposition, yet sliding in opposite directions. This is accomplished by placing three of the guide-beams side by side, the middle one doing duty as a mate to each of the others. The stall-bars and feed-troughs, when the car is empty, occupy a position in the top of the car, entirely out of the way, the feed-troughs being supported by the spring-catches *c*, which are secured to the sides of the car; but as the car is filled, after each animal is in position the feed-troughs and stall-bars are lowered until the troughs rest upon the stops *d* and the bars assume an inclined position, as shown in Fig. 2 of the drawings, thus forming a partition between the animals, giving each a separate stall and feed-trough.

In order to secure the animal's head in its proper position in the stall, the chains *e* may be employed, one end of the chains being attached to the guides *a'*, on the end of the bars E, or to a ring sliding freely on the vertical bars D, while the opposite end is secured to the head or around the neck of the animal. It will be evident that other means of retaining the animal in position within the stall may be used and not depart from the principle involved in this invention—that is, affording a ready means of filling the car with stock, and giving to each animal a separate stall and feed-trough, the whole apparatus employed in accomplishing this end being capable of ready stowage in the upper part of the car, so as to leave it perfectly free and open to be reloaded with stock or other freight.

In order to supply the stock with water while on the road, a tank, G, is secured in the upper part of the car, which may be filled at the ordinary water-stations. From this tank the pipes H H are carried along each side of the car, being provided with cocks $d'$ at that point where they will be opposite each feed-trough when the latter are lowered, and rest upon the stops $d$, so that an attendant, by turning the cocks, can supply each trough with water as often as it may be required.

The use of these devices upon stock-cars will be found of great advantage in enabling them to deliver stock in better condition after transportation over long distances than it is possible to do with the method of transportation in common use, thus recompensing the stockman for the small additional expense, as well as affording him the satisfaction of knowing that he has taken a step forward in the cause of humanity.

Having thus described my invention, I claim as new, and desire to secure by Letters Patent, the following:

1. In a stock-car, the sliding stall-bars E, in combination with the guide-bars D and beams F, for the purpose of forming removable partitions between the animals, as set forth.

2. The combination, in a stock-car, of the sliding stall-bars, vertical guide-bars, and feed-troughs C, as and for the purpose specified.

3. In a stock-car, the chains $e$, attached to the sliding guides $a'$, for securing the heads of the animals so as to allow of free vertical motion, but restrict the side movement of the same, substantially as shown and described.

In testimony whereof I affix my signature in presence of two witnesses.

SYLVESTER H. McGIBENY.

Witnesses:
 DAN. DeWITT,
 CHARLES H. MAXSON.